United States Patent [19]

Komamura et al.

[11] 4,425,422

[45] Jan. 10, 1984

[54] FORMATION OF COLOR PHOTOGRAPHIC IMAGE WITH AZO DYE CONTAINING ALKOXY OR THIOALKOXY METAL CHELATING GROUP

[75] Inventors: Tawara Komamura; Jiro Takahashi, both of Hachioji; Ryuichiro Kobayashi, Tokyo, all of Japan

[73] Assignee: Konishiroku Photo Industry Co., Ltd., Japan

[21] Appl. No.: 375,547

[22] Filed: May 6, 1982

[30] Foreign Application Priority Data

May 11, 1981 [JP] Japan .................................. 56-71165

[51] Int. Cl.³ .................... G03C 1/40; G03C 1/10; G03C 5/54; G03C 7/00
[52] U.S. Cl. ............................ 430/242; 430/222; 430/225; 430/226; 430/562; 430/223; 430/237; 430/241; 430/243
[58] Field of Search ............ 430/237, 241, 242, 222, 430/223, 225, 226, 562, 561, 563

[56] References Cited

U.S. PATENT DOCUMENTS 3,931,144 1/1976 Eldredge et al. .................. 430/223
4,110,113 8/1978 Melzer et al. ..................... 430/223
4,110,355 8/1978 Bloom ............................... 430/223

OTHER PUBLICATIONS

Bailey et al., "Metallizable Dyes for Diffusion Transfer Photography", *Research Disclosure* No. 17334, 9/78.

*Primary Examiner*—Richard L. Schilling
*Attorney, Agent, or Firm*—Finnegan, Henderson, Farabow, Garrett & Dunner

[57] ABSTRACT

A method for the formation of a color photographic image comprising exposure and development of a photographic element, said photographic element comprising at least one silver halide emulsion layer, a compound capable of releasing a diffusible azo dye compound during development, and at least one mordant layer arranged on a support. The color image formation is effected by the reaction of multivalent metallic ions with an azo dye compound having the formula:

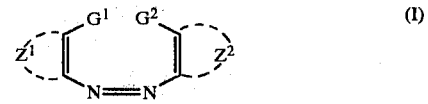

(I)

wherein $G^1$ is an alkoxy or a thioalkoxy metallic chelating group; $G^2$ is a metallic chelating group in which an oxygen atom is involved in the chelate formation; and $Z^1$ and $Z^2$ each is a group of atoms necessary to form an aromatic carbocyclic ring or a heterocyclic ring. The azo dye compound and the metallic ions form a metal complex by coordination of the azo group and the $G^1$ and $G^2$ groups of the azo dye compound with the multivalent metallic ions.

6 Claims, No Drawings

FORMATION OF COLOR PHOTOGRAPHIC IMAGE WITH AZO DYE CONTAINING ALKOXY OR THIOALKOXY METAL CHELATING GROUP

The present invention relates to a method for the formation of a color photographic image, and more particularly to a method for the formation of a color photographic image wherein a stable color photographic image is formed on a mordant layer by the reaction of a diffusible azo dye compound with multivalent metallic ions.

In the color diffusion transfer process, in connection with the development of a silver halide emulsion layer, a diffusible dye is released to be diffused under an alkaline condition, and subsequently the diffused dye is dyed to a mordant layer, thereby forming a dye image thereon. The dye for use in the formation of the color photographic image must be a dye excellent in the preservability of a produced image thereof, that is, must be excellent in light resistance, which is one of the essential conditions required for a photographic image. As one method for improving light resistance, there has been known a method in which the azo dye released imagewise during processing is contacted with a mordant layer or with the metallic ions contained in the layer contiguous thereto to thereby form light-resistant metallic complex dye, which dye is dyed to the mordant layer, whereby a light-resistant color image is obtained. Such a method is described in, e.g., U.S. Pat. No. 4,142,891, No. 4,147,544, No. 4,148,641, No. 4,148,642 and No. 4,148,643, and Research Disclosure No. 17334(1978), No. 18022(1979), and the like. However, the dyes as described in these publications do not necessarily satisfy such other conditions essential to diffusion transfer dyes as excellence in hue (particularly sharpness in spectral absorption), stability of the hue over a wide pH range, excellence in the diffusibility, and the like. Therefore, a development of a method for obtaining a metallic complex dye which is improved in and which satisfies all these respects is desired.

THE SUMMARY OF THE INVENTION

It is an object of the present invention to provide a method for the formation of a color photographic image consisting of a metallic complex azo dye which has a satisfactory light resistance and an excellent hue and is stable over a wide pH range.

As a result of having devoted ourselves to studies on the above subjects, we have found that the above object can be accomplished by a method for the formation of a color photographic image on at least one mordant layer provided on a support, the formation being effected by the reaction of an azo dye compound with multivalent metallic ions to thereby form a color photographic image on the above mordant layer, said azo dye compound having the formula:

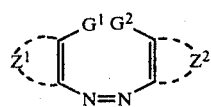

Formula (I)

wherein $G^1$ is an alkoxy or a thioalkoxy group; $G^2$ is a metallic chelating group whose radical involving the chelate is oxygen; and $Z^1$ and $Z^2$ each is a group of atoms necessary to form an aromatic carbocyclic ring or a heterocyclic ring.

DETAILED DESCRIPTION OF THE INVENTION

The method of the present invention is illustrated in further detail.

In Formula (I) representing the azo dye compound of the present invention, the alkoxy or thioalkoxy group represented by $G^1$ is preferably a methoxy group which may have a substituent which includes, e.g., cyano group, while the metallic chelating group represented by $G^2$ is desired to be hydroxyl group. And $Z^1$ and $Z^2$ each is an aromatic ring or heterocyclic ring which includes preferably a benzene ring, naphthol ring, pyrazolone ring, pyridone ring, and the like, and each of these rings is allowed to have a substituent.

In the method of the present invention, the foregoing azo dye compound of the present invention is imagewise distributed on the mordant layer, and, in that condition, is reacted with multivalent metallic ions to thereby form a stable metallic complex azo dye color image, so that the above azo dye compound is desired to be at least diffusible; for example, in order to apply the method of the present invention to a color diffusion transfer type photographic process, it requires the use of a compound that is capable of releasing the above diffusible azo dye compound to be imagewise distributed on the mordant layer.

And as an example of such diffusible azo dye compound releasable type compounds there are those nondiffusible dye releasing compounds having the formula:

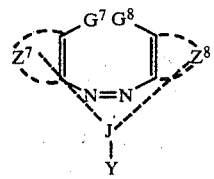

Formula (IV)

wherein $G^7$, $G^8$, $Z^7$ and $Z^8$ are the same as the $G^1$, $G^2$, $Z^1$ and $Z^2$ defined in Formula (I); J is $-[L-(NR^{11})_p-M_q]_r$ or $-[L-M_q-(NR^{11})_p]_r$, wherein L is a divalent group represented by $-R^{12}-(O)_t-R^{13}_u$, wherein $R^{12}$ and $R^{13}$ each is phenylene group which may be substituted, an alkylene group which may be substituted or an arylene-alkylene group which may be substituted, the substituents of the $R^{12}$ and the $R^{13}$ being allowed to be either the same or different from each other, t is 0 or 1, and u is 0 or 1; $R^{11}$ is hydrogen, an alkyl which may be substituted; M is carbonyl or sulfonyl group; p is 0 or 1, q is 0 or 1, r is up to 2; said J being combined with either one ring constituted by $Z^7$ or $Z^8$ or with the constituent thereof. And Y is a ballasting carrier that is capable of releasing diffusible azo dye as a function of the development of a silver halide under an alkaline condition. As the ballasting carrier represented by the Y, there may be used conventionally known groups having, e.g., the following formula:

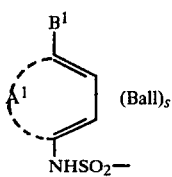

Formula (VII)

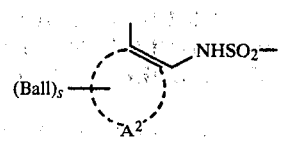

Formula (VIII)

wherein Ball is an organic ballasting group having such a number of carbon atoms as capable of rendering the compound nondiffusible during the development in an alkaline processing composition: $A^1$ is an atom necessary to form a benzene ring, naphthalene ring or a heterocyclic ring such as pyrazolone, pyrimidine, or the like; $B^1$ is $OR^{14}$ or $NHR^{15}$ wherein $R^{14}$ is hydrogen, or a group which is hydrolyzed to provide hydroxy group and $R^{15}$ is hydrogen, an alkyl or a substituted alkyl having from 1 to 20 carbon atoms, the alkyl being allowed also to act by itself as Ball; and s is 0, 1 or 2. Examples of the group having Formula (VII) include the following:

wherein Ball and s are as defined in Formula (VII); and $A^2$ and $B^2$ are the same as the $A^1$ and $B^1$, respectively, defined in Formula (VII). Those groups having Formula (VIII) include the following:

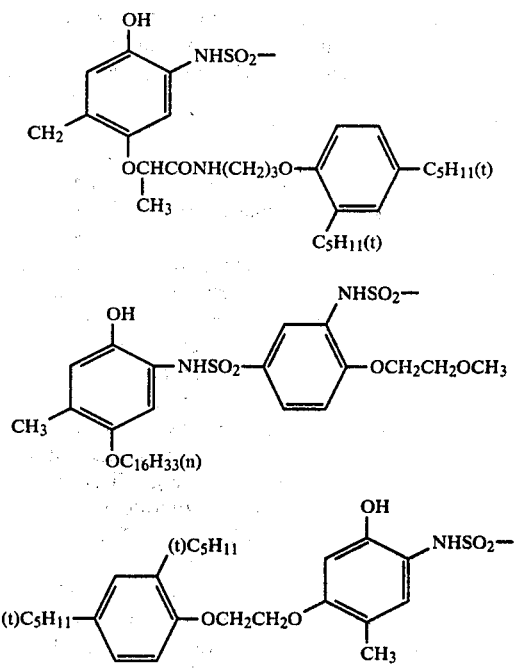

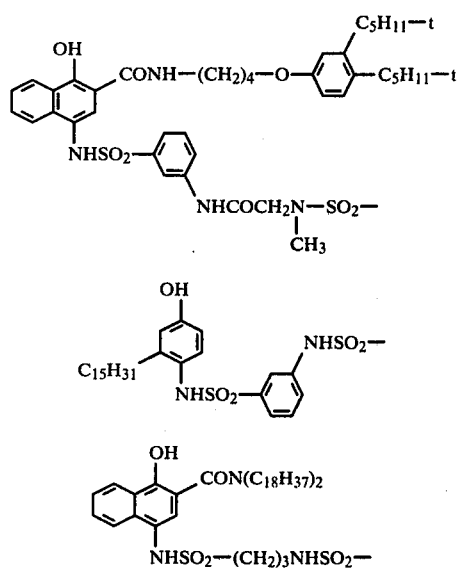

Further particular examples are described in Japanese Patent O.P.I. Publication No. 46730/1976.

Further, other examples suitable for this type of compounds include those having the formula:

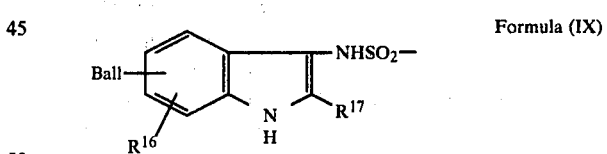

Formula (IX)

Further particular examples of this kind of ballasting carrier groups are described in Japanese Patent Publication Open to Public Inspection (hereinafter referred to as Japanese Patent O.P.I. Publication) No. 33826/1973 and No. 50736/1978. As preferred different examples there are those having the formula:

wherein Ball is as defined in Formula (VII); $R^{16}$ is hydrogen, a halogen, an alkyl or an alkoxy group; $R^{17}$ is an alkyl, phenyl (including substituted phenyl) or carbamide group, or hydrogen. Concrete examples of such compounds include the following:

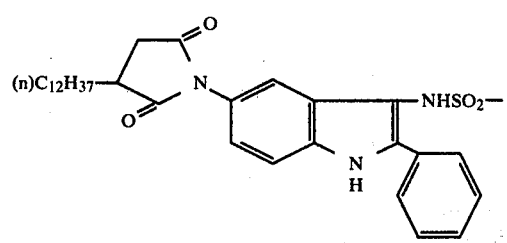

-continued

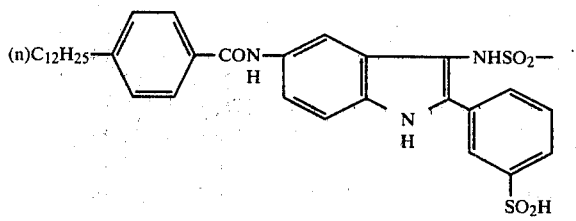

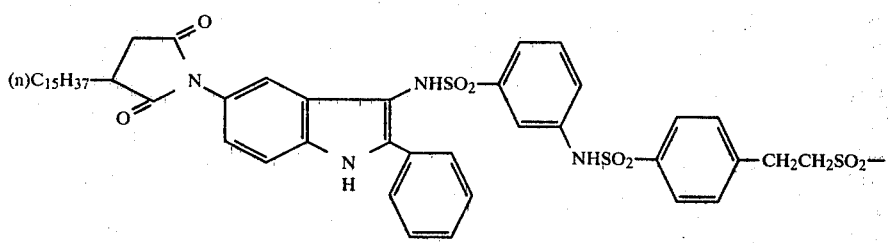

Further particular examples of these groups are described in Japanese Patent Application No. 162940/1980.

Further, as ballasting carriers suitable for this type of compounds there are those groups having the formula:

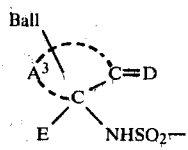

Formula (X)

wherein Ball is as defined in Formula (VII); D is oxygen or =ND' wherein D' is hydroxyl group or substituted or unsubstituted amino group; $A^3$ is a 5- to 7-membered saturated or unsaturated nonaromatic hydrocarbocyclic ring, the hydrocarbocyclic ring being allowed to be fused in an appropriate position thereof with an aromatic hydrocarbocyclic ring or with a heterocyclic ring to form a condensed ring; and E is hydrogen, a halogen such as fluorine, chlorine or bromine. This type includes the following examples:

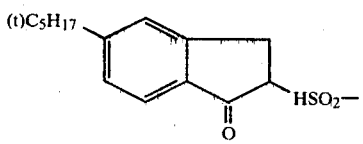

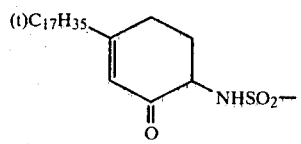

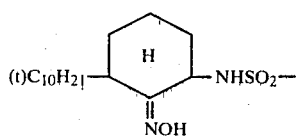

Further particular examples of this kind of groups are described in Japanese Patent O.P.I. Publication No. 3819/1978.

As different compounds having Formula (VI) of the present invention there are those in which the ballasting carrier portion or the carrier in Formula (VI) releases a diffusible azo dye as a reversed function of the development of a silver halide emulsion layer under an alkaline condition.

As the ballasting carrier suitable for this type of compounds there are those having the formula:

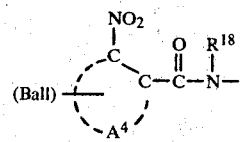

Formula (XI)

wherein Ball is as defined in Formula (VII); $A^4$ is a group of atoms necessary to complete a benzene ring (including those having various substituents thereon), the benzene ring being allowed to be condensed in an appropriate position thereof with a carbocyclic or heterocyclic ring; and $R^{18}$ is an alkyl (including a substituted alkyl). Examples of the group having Formula (XI) include the following:

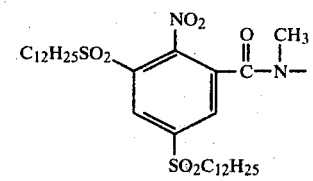

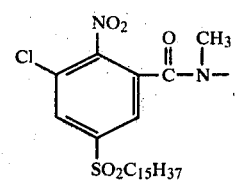

Further particular examples of these groups are described in Japanese Patent O.P.I. Publication No. 110828/1978.

Secondary ones of the ballasting carrier of this kind include also those having the formula:

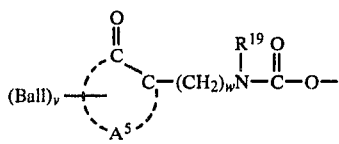

Formula (XII)

wherein Ball is as defined in Formula (VII); $A^5$ is a quinone nucleus (including those having various substituents thereon); w is an integer of 1 or 2; $R^{19}$ is an alkyl or a substituted alkyl group having from 1 to about 40 carbon atoms or an aryl or a substituted aryl group having from 6 to 40 carbon atoms; and V is 0 or 1, the v being 0 or 1 and when $R^{19}$ is a group having not more than 8 carbon atoms, it is 1.

Examples of the group having Formula (XII) include the following:

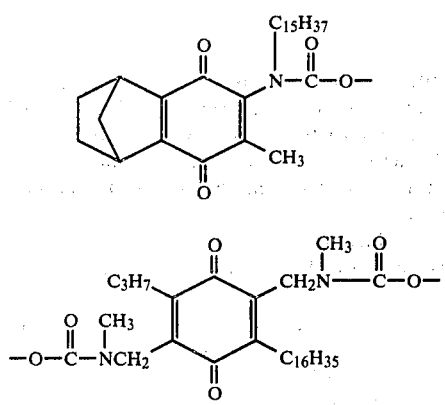

Further particular examples of these groups are described in Japanese Patent O.P.I. Publication No. 110827/1978.

Further, as third ones of the ballasting carrier of this kind, there are those groups having the formula:

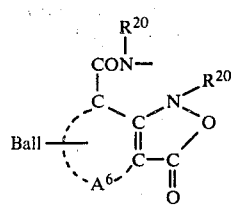

Formula (XIII)

wherein Ball is as defined in Formula (VII); and $A^6$ and $R^{20}$ are the same as the $A^4$ and $R^{18}$, respectively, defined in Formula (XI). Examples of the group having Formula (XIII) include the following:

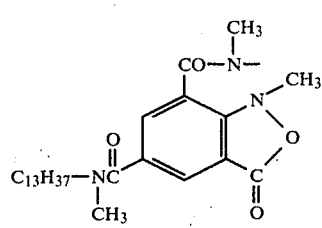

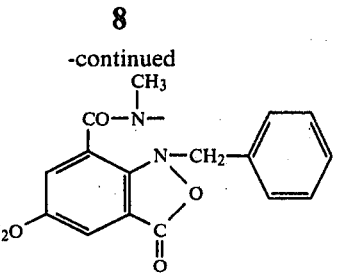

Further particular examples of the groups of this kind are described in Japanese Patent O.P.I. Publications No. 111628/1974 and No. 4819/1977.

Further, as the groups of this kind there are those having the formula:

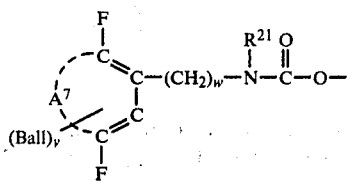

wherein Ball, w and v are as defined in Formula (XII) and $R^{21}$ is the same as the $R^{19}$ defined in the same formula; $A^7$ is as defined in Formula (XI); and F is hydroxyl group or the hydrolyzable precursor thereof.

Examples of the compound having Formula (XIV) include the following:

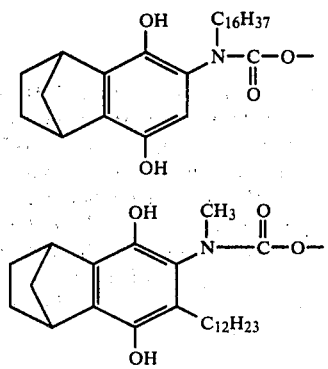

Further particular examples of this kind of groups are described in Japanese Patent O.P.I. Publication No. 63618/1976.

As preferred different ballasting carriers of this kind there also are those groups having the formula:

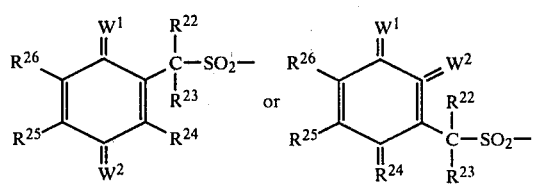

wherein $W^1$ and $W^2$ each is O or NH, the $W^1$ and $W^2$ being allowed to be the same as or different from each other; $R^{22}$ and $R^{23}$ each is hydrogen or an alkyl group; $R^{24}$, $R^{25}$ and $R^{26}$ each is hydrogen, a halogen, an alkyl, an alkoxy or acylamino group or any groups contiguous to each other of the $R^{24}$, $R^{25}$ and $R^{26}$ may be combined together to form a condensed ring, and further at least one of the $R^{22}$, $R^{23}$, $R^{24}$, $R^{25}$ and $R^{26}$ is Ball as defined in Formula (VII). The group having Formula (VX) includes the following:

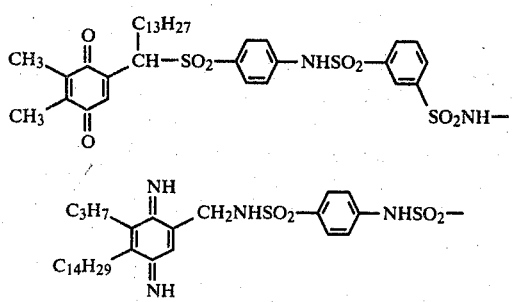

Further particular examples of this kind of groups are described in Japanese Patent O.P.I. Publication No. 130927/1979.

And, as different nondiffusible dye releasing compounds capable of releasing diffusible azo dyes there are those compounds having the formula:

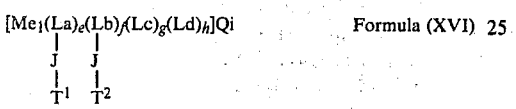

$$[Me_1(La)_e(Lb)_f(Lc)_g(Ld)_h]Qi \quad \text{Formula (XVI)}$$
$$\begin{array}{cc} | & | \\ J & J \\ | & | \\ T^1 & T^2 \end{array}$$

wherein $Me_1$ is a transition metal; La and Lb each is a multidentate ligand; Lc and Ld each is a monodentate or multidentate ligand; $T^1$ is a dye portion; $T^2$ is a dye portion or a ballasting group; the above dye portion represents the dye residue represented by each of the foregoing general formulas; Q is the counter ion of the complex; J is a divalent bonding group as defined in the foregoing Formula (VI); e is an integer of 1, 2 or 3; f is an integer of up to 3, said e being 2 or 3 when f is 0; g and h each is an integer of up to 4; and j is the number of the counter ions which satisfies the neutralization rule of the complex. The compounds of this type are described in detail in Japanese Patent Application No. 183573/1980.

As further different type nondiffusible dye releasing compounds there are those nondiffusible compounds (dye releasing couplers) which releases diffusible azo dyes during the coupling reaction thereof with the oxidized product of the color developing agent oxidized by a silver halide. Nondiffusible dye releasing compounds of this type include those compounds having the formula:

$$(\text{Ball-Coup})_j\text{-Link-}T^3 \quad \text{Formula (XVII)}$$

wherein Ball is as defined in Formula (VII); Coup is a coupler residue capable of coupling with the oxide of a color developing agent; Link is coupled with the Coup portion at the active site thereof and is a group (such as azo group, azoxy group, —O—, alkylidene group, —S—, —NHSO$_2$) whose bonding with the Coup portion is cleavable during the coupling reaction of a nondiffusible dye releasing compound having Formula (XVII) with the oxide of the color developing agent; j is an integer of 1 or 2 when Link is an alkylidene group and is 1 when Link is one of the above groups other than alkylidene group; and $T^3$ is the same as $T^1$ defined in Formula (XVI).

The (Ball-Coup)$_j$-Link-portion of compounds of this type is described in U.S. Pat. No. 3,227,550.

A generally known method for obtaining a color diffusion transfer image using a nondiffusible compound having Formula (VI) is such as, e.g., in accordance with the following steps (1) to (4):

(1) Layers each containing a silver halide emulsion and a nondiffusible dye releasing compound are exposed imagewise, and the exposed portion is processed in an alkaline processing composition in the presence of a silver halide developing agent to thereby develop the exposed area of each of the silver halide emulsion layers, (2) thus, the above dye releasing compound releases imagewise a diffusible azo dyes as a function of the development of each of the silver halide emulsion layers, (3) at least one portion of the azo dye image distribution is diffused into a dye image receiving layer (mordant layer), and (4) the diffused azo dye is contacted with metallic ions to thereby form a stable metallic complex azo dye transfer image.

A different and preferred method of forming a color image according to the present invention comprises the following steps (1) to (5):

(1) Layers each containing a silver halide emulsion and a nondiffusible dye releasing compound are imagewise exposed, and the exposed portion is processed with an alkaline processing composition in the presence of a silver halide developing agent to develop each of the silver halide emulsion layers, whereby the developing agent is oxidized, (2) the oxidized developing agent is cross-oxidized with the dye releasing compound, (3) the cross-oxidized dye releasing compound is then alkali-hydrolyzed to be cleaved to release imagewise a diffusible azo dye as a function of the imagewise exposure of each of the silver halide emulsions, (4) at least one portion of the azo dye image distribution is diffused into the dye image receiving layer (mordant layer), and (5) the diffused azo dye is contacted with metallic ions to thereby form a stable metallic complex azo dye transfer image.

According to the present invention, the diffuxible azo dye released from the nondiffusible dye releasing compound is not in the form of a metallic complex when released, but when the dye has reached the image receiving layer or the layer contiguous thereto it comes into contact with the multivalent metallic ions which are present in the image receiving layer or the layer contiguous thereto thereby to form a metallic complex dye compound. Alternatively, the azo dye may be in advance diffused in the above image receiving layer and then contacted with the multivalent metallic ions in a bath to thereby form a metallic complex dye. The metal as the most useful source of the multivalent metallic ions in the present invention should be rapidly reacted with the azo dye to form a complex dye having a desirable hue, be securely coordinated with the ligand to be in a stable oxidized condition, be stable against light, heat and chemicals, be substantially colorless when present in the image receiving layer, and be inactive to the silver halide emulsion layer. Those multivalent metals having such natures include, e.g., copper (II), nickel (II), palladium (II), zinc (II), platinum (II) and cobalt (II), particularly desirable ones of which are copper (II) and nickel (II).

In applying the method of the present invention to the color diffusion transfer process, a desirable compound to be used in the layer containing the above multivalent metal is a polymer having a metallic complex formable ligand. Examples of such compounds include those polymers consisting of polymer units having the formula:

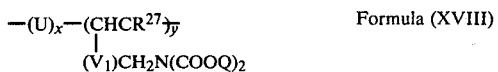

Formula (XVIII)

wherein U is

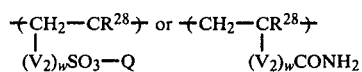

wherein $R^{28}$ is an alkyl group, $V_2$ is a divalent bonding group, Q is hydrogen, ammonium cation or an alkaline metal, and w is an integer or 0 or 1; $V_1$ is a divalent bonding group; $R^{27}$ is an alkyl group; x is from 20 to 95% by weight; and y is from 80 to 5% by weight.

Further different examples of the above polymers are those consisting of polymer units having the formula:

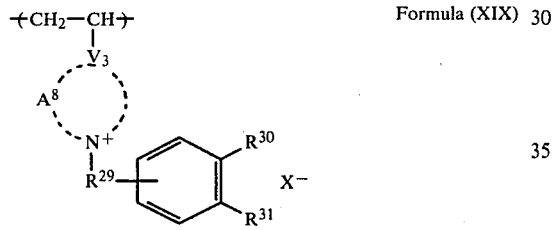

Formula (XIX)

wherein $V_3$ is a single bonding or divalent bonding group; $A^8$ is a group of atoms necessary to complete a heterocyclic ring; $R^{29}$ is a single bonding or an alkylene group; $R^{30}$ and $R^{31}$ are chelating groups independent of each other; and $X^-$ is anion.

These polymer compounds are described in further detail in Japanese Patent O.P.I. Publication No. 48210/1980.

The method for providing the multivalent ions of the present invention includes, in addition to the use of the above ligand polymer, the incorporation of a metallic complex of bis(acetylacetonate) into a mordant layer, and a procedure in which after the diffusion transfer of an image, the dye image portion is immersed in an aqueous solution containing multivalent metallic ions to thereby form a metallic complex.

The azo dye compound of the present invention having Formula (I) is coordinated with multivalent metallic ions to form a complex having the following structure:

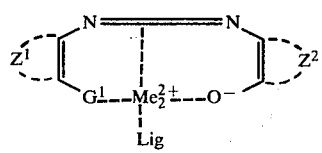

wherein $Z^1$, $Z^2$ and $G^1$ are as defined in Formula (I); $Me_2^{2+}$ is divalent metallic ions such as Cu(II), Ni(II);

Lig is one or more ligands depending on the coordinating number of metal, such as $H_2O$, $Cl^-$.

The color image by a metallic complex azo dye compound may be formed in the following procedure: After a diffusible dye is released from the nondiffusible dye releasing compound, undiffused residual nondiffusible dye image distribution and developed silver remain, and when the remaining silver is removed in a manner known to the field of photography, then the imagewise nondiffusible azo dye compound alone remains. The resulting dye compound is then formed to be a metallic complex in the above manner to thereby obtain a color image consisting of a metallic complex azo dye compound. The above residual image may be obtained also by diffusing it into a bath or the like without transfering as the azo dye image distribution.

The following are examples of those azo dye compounds of the present invention having Formula (I):

Exemplified Compounds:

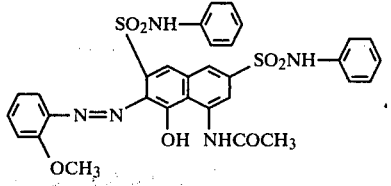

Compound (1)

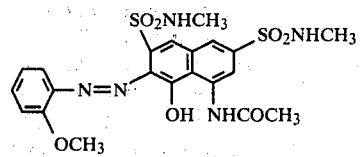

Compound (2)

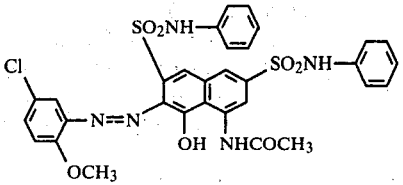

Compound (3)

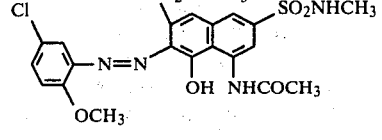

Compound (4)

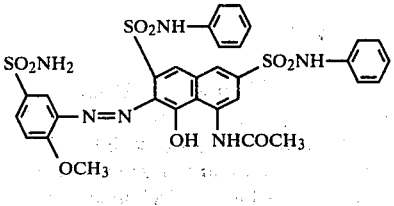

Compound (5)

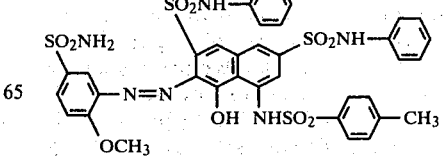

Compound (6)

-continued
Exemplified Compounds:

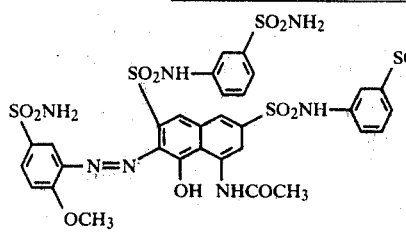
Compound (7)

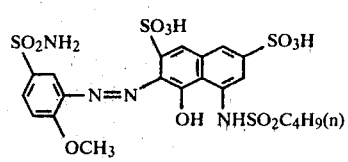
Compound (8)

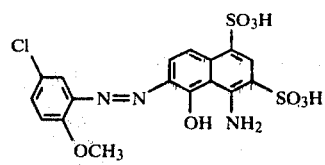
Compound (9)

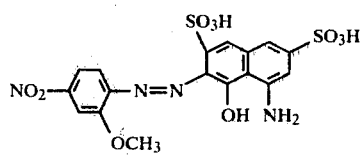
Compound (10)

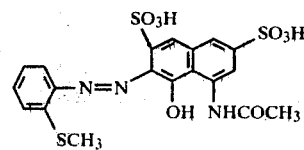
Compound (11)

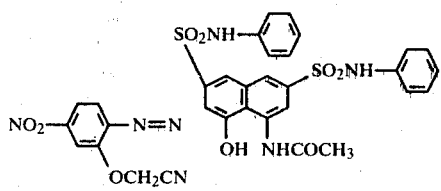
Compound (12)

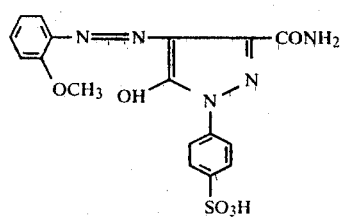
Compound (13)

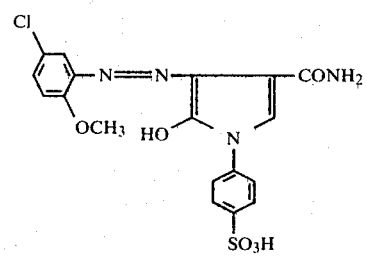
Compound (14)

-continued
Exemplified Compounds:

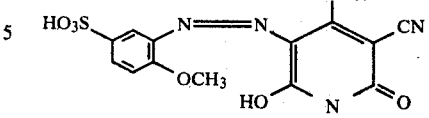
Compound (15)

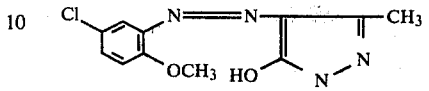
Compound (16)

Typical synthesis examples of the above azo dye compounds are given below:

SYNTHESIS EXAMPLE 1

Synthesis of Exemplified Compound (1)

0.615 g (0.005 mol) of 2-methoxyaniline was added to 10 ml of water, to which were further added 1.1 ml of concentrated hydrochloric acid. To the mixture, after cooling to 0° C., was slowly added dropwise an aqueous solution of 0.295 g of sodium nitrite dissolved into 2 ml of water. After the addition, the mixture was stirred for 30 minutes at 0° C. Subsequently the solution was added dropwise to a mixed aqueous solution of 2.555 g (0.005 mol) of 3,6-di-N-phenyl-sulfamoyl-8-N-acetylamino-1-naphthol and 1.5 g of sodium hydroxide dissolved into 30 ml of water, and to the resulting mixture, after being stirred for one hour, was slowly added, cooling by ice, 5 ml of concentrated hydrochloric acid to thereby produce a precipitate, which was then filtrated and dried, whereby 2.46 g of an objective product were obtained. M.P. 160°–162° C.

SYNTHESIS EXAMPLE 2

Synthesis of Exemplified Compound (12)

(Synthesis of an intermediate 1-cyanomethoxyaniline)

2.5 g (0.11 mol) of metallic sodium were added to 150 ml of ethanol. After the metallic sodium was completely dissolved, the solution was cooled to room temperature, and to the solution were added 17.8 g (0.1 mol) of 1-aminophenol, and then, with stirring, were added dropwise 12 g (0.1 mol) of bromoacetonitrile, and after that the mixture was refluxed with heating for five hours. To this, after cooling to room temperature, were further added 6 g (0.05 mol) of bromoacetonitrile which was then refluxed with heating for three hours, from which the ethanol was subsequently removed by distillation under reduced pressure. 50 ml of an 1 N aqueous sodium hydroxide solution were added to the reaction system, which, after stirring for a while, was filtered, and the thus obtained solid was washed three times with 10 ml of an aqueous sodium hydroxide solution, and then, after the addition of 100 ml of ethanol, was filtered, and from the filtrate the ethanol was removed by distillation under reduced pressure, and the thus obtained solid was separated and refined by column chromatographic procedure to obtain 4.8 g of an objective product, 1-cyanomethoxyaniline. This 1-cyanomethoxyaniline and H acid were used to obtain Exemplified Compound (12) in the same manner as in the case of Exemplified Compound (1). M.P. 196°–198° C.

Other exemplified compounds were also obtained in similar manners to the above.

EXAMPLE 1

In accordance with the following procedure, azo dyes as color photographic image were tested.

A dyed film strip containing a mixture of gelatin and a latex mordant (ratio by weight 1/1) (prepared by coating on a transparent polyester support the respective components with each coating amount of 2.5 g/m$^2$) was tested for the hue, light resistance, and the dependence thereof upon pH with the use of a spectrophotometer.

The latex mordant used herein is what is disclosed in Japanese Patent C.P.I. Publication No. 73440/1976 by Gerald, Allan, Campbell, et al., and is poly(styrene-co-vinyl-benzyl chloride-co-N-benzyl-N,N-dimethyl-N-vinylbenzyl ammonium chloride-co-divinyl-benzene (molar ratio 4.90:0.49:4.41:0.2).

Each of the azo dyes shown in Table 1 was first dissolved in a 0.86 N aqueous potassium hydroxide solution, and an undyed mordant strip was immersed in this dye solution, which immersion was continued until the transmission density of the strip became about 1.0. Subsequently the strip was washed and then immersed for about 10 minutes in an aqueous solution containing metallic ions (divalent copper and divalent nickel) to thereby form a complete metallic complex. Next, the strip was washed and then immersed in a given pH-having standard buffer solution to be equilibrated for about 5 minutes and then dried.

A. Hue:

The absorption spectrum of the dye dyed to the mordant on the transparent support was measured in transmission by a spectrophotometer. The maximum wavelength ($\lambda$max) of the absorption, the absorption band width when the $\lambda$max is taken to half, and the absorption band width when the same is taken to $\frac{1}{3}$ ($\frac{1}{2}$BW and $\frac{1}{3}$BW) are what indicate the hue, particularly the $\frac{1}{2}$BW and $\frac{1}{3}$BW become smaller as the brightness and purity of a color increase, and the $\frac{1}{2}$BW is preferably around 100 nm, while the $\frac{1}{3}$BW has a value of 25-35 nm larger than that of the $\frac{1}{2}$BW. These $\lambda$max, $\frac{1}{2}$BW and $\frac{1}{3}$BW are shown in Table 1.

B. The dependence of the hue upon pH:

The dye released from the nondiffusible dye releasing compound is alkaline during processing and becomes an acidic as about pH4 with time, and therefore should show a hue stable over a wide pH range. Table 1 shows the range wherein each dye retains a desirable and stable hue in the condition that it is dyed to the mordant.

C. Light resistance:

A dyed film strip was exposed to light and then measured for the light resistance thereof in accordance with the following procedure:

A dyed strip piece with a transmission density of about 1.0 to 1.5 was exposed to a 6000 W xenon lamp light over a period of 48 hours (6000 lux on the surface of the strip), and the optical densities according to $\lambda$max of the strip before and after the exposure (before the exposure: Do, after the exposure: D) were measured to determine the value of $D/D_o \times 100$ as the residual percent (%). The results obtained are as shown in Table 1.

TABLE 1

| Exemplified compound | Chelate metal | Hue of dye $\lambda$ max (nm) | $\frac{1}{2}$ Bw (nm) | $\frac{1}{3}$ Bw (nm) | Light resistance $D/D_0 \times 100$ | Good hue-showing pH range |
|---|---|---|---|---|---|---|
| 1 | Free | 531, 576 | 109 | 132 | 70 | 4 ~ 7 |
|   | Cu$^{2+}$ | 537 | 109 | 143 | 97 | 2 ~ 12 |
|   | Ni$^{2+}$ | 555, 527 | 97 | 122 | 94 | 2 ~ 12 |
| 2 | Free | 531, 575 | 109 | 130 | 70 | 4 ~ 6 |
|   | Cu$^{2+}$ | 535 | 103 | 129 | 94 | 2 ~ 10 |
|   | Ni$^{2+}$ | 550 | 89 | 117 | 95 | 2 ~ 12 |
| 3 | Free | 533, 570 | 113 | 143 | 75 | 4 ~ 7 |
|   | Cu$^{2+}$ | 536 | 107 | 139 | 96 | 4 ~ 10 |
|   | Ni$^{2+}$ | 547 | 94 | 122 | 90 | 2 ~ 12 |
| 4 | Free | 527 ~ 570(sh) | 95 | 112 | 60 | 4 ~ 7 |
|   | Cu$^{2+}$ | 532 | 98 | 121 | 90 | 2 ~ 12 |
|   | Ni$^{2+}$ | 551, 530(sh) | 93 | 112 | 85 | 2 ~ 12 |
| 5 | Free | 531, 568 | 93 | 126 | 70 | 4 ~ 7 |
|   | Cu$^{2+}$ | 538, 560 | 109 | 138 | 95 | 2 ~ 12 |
|   | Ni$^{2+}$ | 558 | 97 | 138 | 97 | 2 ~ 12 |
| 6 | Free | 567, 538 | 101 | 126 | 85 | 4 ~ 10 |
|   | Cu$^{2+}$ | 538 | 109 | 143 | 100 | 4 ~ 10 |
|   | Ni$^{2+}$ | 553 | 98 | 125 | 95 | 2 ~ 12 |
| 7 | Free | 527, 565 | 104 | 126 | 83 | 4 ~ 10 |
|   | Cu$^{2+}$ | 536 | 108 | 138 | 98 | 2 ~ 12 |
|   | Ni$^{2+}$ | 554 | 96 | 119 | 93 | 2 ~ 12 |
| 8 | Free | 527, 570 | 95 | 112 | 84 | 4 ~ 6 |
|   | Cu$^{2+}$ | 532 | 98 | 121 | 96 | 4 ~ 10 |
|   | Ni$^{2+}$ | 551, 530 | 93 | 112 | 92 | 2 ~ 12 |
| 9 | Free | 552 | 114 | 146 | 48 | 2 ~ 12 |
|   | Cu$^{2+}$ | 555 | 126 | 167 | 84 | 2 ~ 12 |
|   | Ni$^{2+}$ | 556 | 100 | 143 | 65 | 2 ~ 12 |
| 10 | Free | 555 | 130 | 180 | 55 | 2 ~ 12 |
|   | Cu$^{2+}$ | 550 | 125 | 165 | 85 | 2 ~ 12 |
|   | Ni$^{2+}$ | 560 | 122 | 158 | 80 | 2 ~ 12 |
| 11 | Free | 544 | 112 | 148 | 75 | 2 ~ 12 |
|   | Cu$^{2+}$ | 554 | 117 | 152 | 90 | 2 ~ 12 |
|   | Ni$^{2+}$ | 546 | 111 | 142 | 88 | 2 ~ 12 |
| 12 | Free | 595 | 140 | 190 | 65 | 4 ~ 8 |
|   | Cu$^{2+}$ | 605 | 120 | 145 | 94 | 4 ~ 10 |
|   | Ni$^{2+}$ | 615 | 115 | 140 | 91 | 4 ~ 12 |
| 13 | Free | 461 | 98 | — | 74 | 4 ~ 6 |
|   | Cu$^{2+}$ | 439 | 108 | — | 95 | 4 ~ 8 |

TABLE 1-continued

| Exemplified compound | Chelate metal | Hue of dye λ max (nm) | Hue of dye ½ Bw (nm) | Hue of dye ⅓ Bw (nm) | Light resistance $D/D_0 \times 100$ | Good hue-showing pH range |
|---|---|---|---|---|---|---|
| | $Ni^{2+}$ | 450 | 86 | — | 98 | 2 ~ 12 |
| 14 | Free | 455 | 112 | — | 55 | 2 ~ 12 |
| | $Cu^{2+}$ | 442 | 116 | — | 94 | 2 ~ 12 |
| | $Ni^{2+}$ | 453 | 96 | — | 98 | 2 ~ 12 |
| 15 | Free | 458 | 90 | 109 | 48 | 4 ~ 6 |
| | $Cu^{2+}$ | 445 | 68 | 93 | 96 | 4 ~ 10 |
| | $Ni^{2+}$ | 454 | 84 | 108 | 86 | 4 ~ 10 |
| 16 | Free | 414 | 126 | — | 80 | 4 ~ 10 |
| | $Cu^{2+}$ | 413 | 110 | — | 97 | 2 ~ 12 |
| | $Ni^{2+}$ | 433 | 90 | — | 97 | 2 ~ 12 |
| Comparison-A | Free | — | — | — | — | — |
| | $Cu^{2+}$ | 459 | 94 | — | 95 | 2 ~ 10 |
| | $Ni^{2+}$ | 452 | 103 | — | 94 | 2 ~ 4 |
| Control B | Free | — | — | — | — | — |
| | $Cu^{2+}$ | 473 | 123 | — | 96 | 2 ~ 4 |
| | $Ni^{2+}$ | 455 | 100 | 140 | 93 | 2 ~ 4 |
| Control C | Free | — | — | — | — | — |
| | $Cu^{2+}$ | 534 | 116 | — | 95 | 2 ~ 10 |
| | $Ni^{2+}$ | 528 | 154 | — | 91 | 2 ~ 10 |
| Control D | Free | — | — | — | — | — |
| | $Cu^{2+}$ | 542 | 102 | 153 | 85 | 2 ~ 10 |
| | $Ni^{2+}$ | 538 | 128 | 170 | 80 | 2 ~ 10 |

(Control-A)

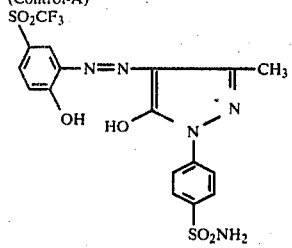

(Control-B)

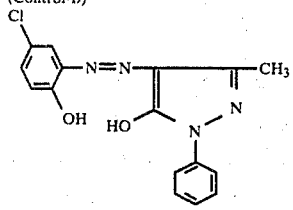

(Control-C)

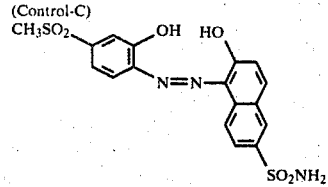

(Control-D)

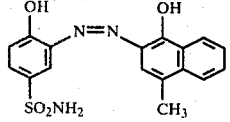

As apparent from Table 1, the metallic complex of each of the diffusible azo dye compounds of the present invention is excellent not only in hue but also in light resistance and stability of the hue over a wide pH range.

In contrast to this, the azo dyes A, B, C and D of the control compounds show large variation and instability of their hues according to the change in the pH values.

We claim:

1. A method for the formation of a color photographic image comprising exposure and development of a photographic element, said photographic element comprising at least one silver halide emulsion layer, a compound capable of releasing a diffusible azo dye compound during development, and at least one mordant layer arranged on a support, said color image formation being effected by the reaction of said azo dye compound with multivalent metallic ions, said azo compound having the formula:

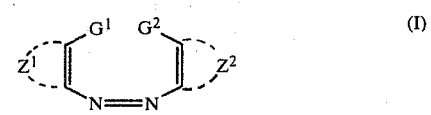

wherein $G^1$ is an alkoxy or a thioalkoxy metallic chelating group; $G^2$ is a metallic chelating group in which the radical involving the chelate is oxygen; $Z^1$ is a group of atoms necessary to form an aromatic carbocyclic ring; and $Z^2$ is a group of atoms necessary to form an aromatic carbocyclic ring or a heterocyclic ring, said reaction of said azo dye compound with said metallic ions forming a metal complex by coordination of the azo group and the $G^1$ and $G^2$ groups of said azo dye compound with said multivalent metallic ions.

2. The method for the formation of a color photographic image as defined in claim 1 wherein said azo dye compound has the formula:

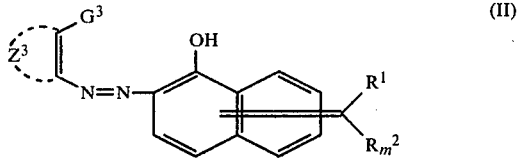

(II)

wherein $G^3$ is an alkoxy or a thioalkoxy metallic chelating group; $Z^3$ is a group of atoms necessary to form a benzene or naphthalene ring; $R^1$ is hydrogen, $NHSO_2P^3$, $NHCOR^3$, $NHR^3$, $N(P^3)_2$, $NHSO_2NHR^3$, $NHSO_3R^3$, $OR^3$, $OCOR^3$, or $OCO_2R^3$ wherein $R^3$ is hydrogen, a substituted or unsubstituted alkyl, or a substituted or unsubstituted aryl; $R^2$ is hydrogen, substituted or unsubstituted sulfamoyl, substituted or unsubstituted carbamoyl, sulfoxy or carboxy group; and m is an integer of 1 or 2.

3. The method for the formation of a color photographic image as defined in claim 1 wherein said azo dye compound has the formula:

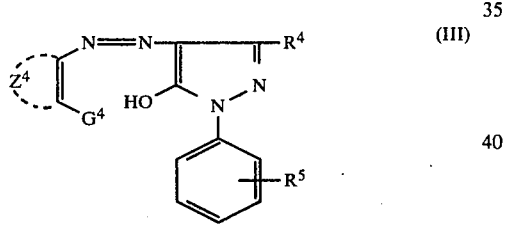

(III)

wherein $G^4$ is an alkoxy or a thioalkoxy metallic chelating group; $Z^4$ is a group of atoms necessary to form a benzene or naphthalene ring; $R^5$ is hydrogen, substituted or unsubstituted sulfamoyl, substituted or unsubstituted carbamoyl, sulfoxy or carboxy group; and $R^4$ is cyano, nitro, an alkyl, substituted or unsubstituted amino, carbamoyl, sulfamoyl, methoxycarbonyl, acetyl, mesyl, or tosyl.

4. The method for the formation of a color photographic image as defined in claim 1 wherein said azo dye compound has the formula:

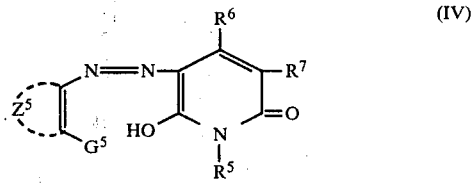

(IV)

wherein $G^5$ is an alkoxy or a thioalkoxy metallic chelating group; $Z^5$ is a group of atoms necessary to form a benzene or naphthalene ring; $R^6$ is hydrogen, a halogen, carboxy, carbamoyl, substituted or unsubstituted amino, or a substituted or unsubstituted alkyl group; $R^7$ is hydrogen, carboxy, carbamoyl, cyano, or trifluoromethyl group; and $R^8$ is hydrogen, a substituted or unsubstituted alkyl, or a substituted or unsubstituted aryl group.

5. The method for the formation of a color photographic image as defined in claim 1 wherein said azo dye compound has the formula:

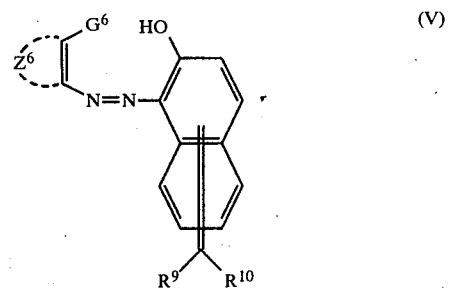

(V)

wherein $G^6$ is an alkoxy or thioalkoxy metallic chelating group; $Z^6$ is a group of atoms necessary to form a benzene or naphthalene ring; $R^9$ is hydrogen, substituted or unsubstituted sulfamoyl, substituted or unsubstituted carbamoyl, sulfoxy or carboxy group; and $R^{10}$ is hydrogen, a halogen, hydroxyl, substituted or unsubstituted amino, an alkoxy, or an alkoxycarbonyl group.

6. The method for the formation of a color photographic image as defined in claim 1 wherein said multivalent metallic ions are divalent nickel, copper, zinc, platinum, palladium or cobalt ions.

* * * * *

UNITED STATES PATENT AND TRADEMARK OFFICE
CERTIFICATE OF CORRECTION

PATENT NO. : 4,425,422

DATED : January 10, 1984

INVENTOR(S) : Tawara Komamura et al.

It is certified that error appears in the above—identified patent and that said Letters Patent is hereby corrected as shown below:

Claim 2, formula (II) - "$R_m^2$" should be --$R^2_m$--.

Signed and Sealed this

Twentieth Day of March 1984

[SEAL]

Attest:

GERALD J. MOSSINGHOFF

Attesting Officer     Commissioner of Patents and Trademarks